US011423219B2

(12) United States Patent
Viswanathan et al.

(10) Patent No.: US 11,423,219 B2
(45) Date of Patent: Aug. 23, 2022

(54) GENERATION AND POPULATION OF NEW APPLICATION DOCUMENT UTILIZING HISTORICAL APPLICATION DOCUMENTS

(71) Applicant: International Business Machines Corporation, Armonk, NY (US)

(72) Inventors: Balaji Viswanathan, Bangalore (IN); Ajay Gupta, New Delhi (IN); Harshit Kumar, New Delhi (IN); Arvind Agarwal, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 118 days.

(21) Appl. No.: 16/823,777

(22) Filed: Mar. 19, 2020

(65) Prior Publication Data

US 2021/0294969 A1 Sep. 23, 2021

(51) Int. Cl.
*G06F 40/186* (2020.01)
*G06F 16/93* (2019.01)
(Continued)

(52) U.S. Cl.
CPC ............ *G06F 40/186* (2020.01); *G06F 16/93* (2019.01); *G06F 40/253* (2020.01); *G06F 40/30* (2020.01); *G06N 20/00* (2019.01)

(58) Field of Classification Search
CPC ...... G06F 40/186; G06F 16/93; G06F 40/253; G06F 16/355; G06F 40/174; G06F 40/30;
(Continued)

(56) References Cited

U.S. PATENT DOCUMENTS 5,579,467 A   11/1996   Capps
5,774,833 A * 6/1998   Newman ................. G06F 40/30
                                                          704/9
(Continued)

OTHER PUBLICATIONS

N/A, "Live Career", Website, Accessed on Oct. 13, 2019, 3 pages, Available at: https://www.livecareer.com/.

*Primary Examiner* — Wilson W Tsui
(74) *Attorney, Agent, or Firm* — Ference & Associates LLC

(57) ABSTRACT

One embodiment provides a method, including: obtaining a plurality of previously submitted application documents, wherein each of the previously submitted application documents comprises information provided by a user who initiated a given previously submitted application document; clustering the plurality of previously submitted application documents into clusters of application documents based upon topics of the previously submitted application documents; selecting a representative application document; identifying entities contained within a given representative application document, wherein each of the entities corresponds to information to be entered into a new application document created from the given representative application document; and engaging in a dialogue with a user to create the new application document utilizing a similar representative application document to request information from the user, wherein the similar representative application document comprises a representative application document of a cluster having a topic similar to a topic of the new application document.

19 Claims, 4 Drawing Sheets

(51) Int. Cl.
    *G06F 40/253*     (2020.01)
    *G06F 40/30*     (2020.01)
    *G06N 20/00*     (2019.01)

(58) Field of Classification Search
    CPC ........ G06F 16/35; G06F 16/285; G06F 40/10; G06N 20/00
    See application file for complete search history.

(56) References Cited

U.S. PATENT DOCUMENTS

| | | | |
|---|---|---|---|
| 6,085,201 A | | 7/2000 | Tso |
| 6,651,217 B1* | | 11/2003 | Kennedy ............... G06F 40/174 |
| | | | 715/224 |
| 9,262,393 B2* | | 2/2016 | Naderi ................. G06F 40/174 |
| 9,430,455 B2 | | 8/2016 | Schuster |
| 9,514,414 B1* | | 12/2016 | Rosswog ............... G06N 7/005 |
| 10,296,579 B2 | | 5/2019 | Takeuchi et al. |
| 11,003,862 B2* | | 5/2021 | Aggarwal ............... G10L 15/02 |
| 2002/0046074 A1 | | 4/2002 | Barton |
| 2002/0128935 A1* | | 9/2002 | White .................... G06Q 30/02 |
| | | | 705/26.8 |
| 2004/0181749 A1* | | 9/2004 | Chellapilla ........ G06K 9/00449 |
| | | | 715/222 |
| 2011/0202528 A1* | | 8/2011 | Deolalikar ............ G06F 16/355 |
| | | | 707/737 |
| 2013/0198628 A1* | | 8/2013 | Ethier ................... G06F 3/0484 |
| | | | 715/709 |
| 2017/0046622 A1* | | 2/2017 | Gaither ................. G06F 40/247 |
| 2018/0144421 A1 | | 5/2018 | Williams et al. |
| 2019/0205322 A1* | | 7/2019 | Dobrynin .............. G06F 16/334 |

\* cited by examiner

GENERATION AND POPULATION OF NEW APPLICATION DOCUMENT UTILIZING HISTORICAL APPLICATION DOCUMENTS

BACKGROUND

The increase in the use of computing devices (e.g., personal computers, tablets, smart phones, etc.) has also increased the use of electronic media (e.g., emails, text messages, chatbots, etc.) for communicating between individuals. The use of electronic media to convey information has allowed individuals to provide information to different entities at any time and the entities can employ an automated system to properly direct and process the communication. In order to employ the automated systems, the entities generally create an application document that has a specific format so that the system is able to identify what information is included within the application document. Additionally, in creating the application document, the entity attempts to include as many structured information fields as feasible. Structured information is information which is provided in a predetermined format, for example, a telephone number, name, address, and the like. Structured information is contrasted with unstructured information which is information that is provided without a predetermined structure and generally provided in a natural language format. Example unstructured fields include comment sections, description of problem sections, additional information sections, and the like.

BRIEF SUMMARY

In summary, one aspect of the invention provides a method, comprising: obtaining a plurality of previously submitted application documents, wherein each of the previously submitted application documents comprises information provided by a user who initiated a given previously submitted application document, wherein at least a portion of the information comprises unstructured information; clustering the plurality of previously submitted application documents into clusters of application documents based upon topics of the previously submitted application documents, wherein the previously submitted application documents within a given cluster have similar topics among the previously submitted application documents included in the given cluster; selecting, for each cluster, a representative application document; identifying, for each representative application document, entities contained within a given representative application document, wherein each of the entities corresponds to information to be entered into a new application document created from the given representative application document; and engaging in a dialogue with a user to create the new application document utilizing a similar representative application document to request information from the user, wherein the similar representative application document comprises a representative application document of a cluster having a topic similar to a topic of the new application document.

Another aspect of the invention provides an apparatus, comprising: at least one processor; and a computer readable storage medium having computer readable program code embodied therewith and executable by the at least one processor, the computer readable program code comprising: computer readable program code configured to obtain a plurality of previously submitted application documents, wherein each of the previously submitted application documents comprises information provided by a user who initiated a given previously submitted application document, wherein at least a portion of the information comprises unstructured information; computer readable program code configured to cluster the plurality of previously submitted application documents into clusters of application documents based upon topics of the previously submitted application documents, wherein the previously submitted application documents within a given cluster have similar topics among the previously submitted application documents included in the given cluster; computer readable program code configured to select, for each cluster, a representative application document; computer readable program code configured to identify, for each representative application document, entities contained within a given representative application document, wherein each of the entities corresponds to information to be entered into a new application document created from the given representative application document; and computer readable program code configured to engage in a dialogue with a user to create the new application document utilizing a similar representative application document to request information from the user, wherein the similar representative application document comprises a representative application document of a cluster having a topic similar to a topic of the new application document.

An additional aspect of the invention provides a computer program product, comprising: a computer readable storage medium having computer readable program code embodied therewith, the computer readable program code executable by a processor and comprising: computer readable program code configured to obtain a plurality of previously submitted application documents, wherein each of the previously submitted application documents comprises information provided by a user who initiated a given previously submitted application document, wherein at least a portion of the information comprises unstructured information; computer readable program code configured to cluster the plurality of previously submitted application documents into clusters of application documents based upon topics of the previously submitted application documents, wherein the previously submitted application documents within a given cluster have similar topics among the previously submitted application documents included in the given cluster; computer readable program code configured to select, for each cluster, a representative application document; computer readable program code configured to identify, for each representative application document, entities contained within a given representative application document, wherein each of the entities corresponds to information to be entered into a new application document created from the given representative application document; and computer readable program code configured to engage in a dialogue with a user to create the new application document utilizing a similar representative application document to request information from the user, wherein the similar representative application document comprises a representative application document of a cluster having a topic similar to a topic of the new application document.

A further aspect of the invention provides a method, comprising: receiving input from a user to generate a new application document; identifying a similar representative application document whose purpose is similar to a purpose of the new application document, wherein the identifying a representative application document comprises (i) accessing a plurality of previously submitted application documents (a) that have been previously completed and (b) that comprise a plurality of sections, a subset of the sections comprising unstructured information, (ii) grouping the plurality of previously submitted application documents into groups of application documents having similar purposes, and (iii) selecting, from the previously submitted application documents in a given group, a representative application document for the given group; requesting information from the user utilizing the similar representative application document, wherein the information comprises information to complete the new application document based upon sections and entities included in the similar representative application document; and iteratively requesting information from the user until the new application document is complete.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
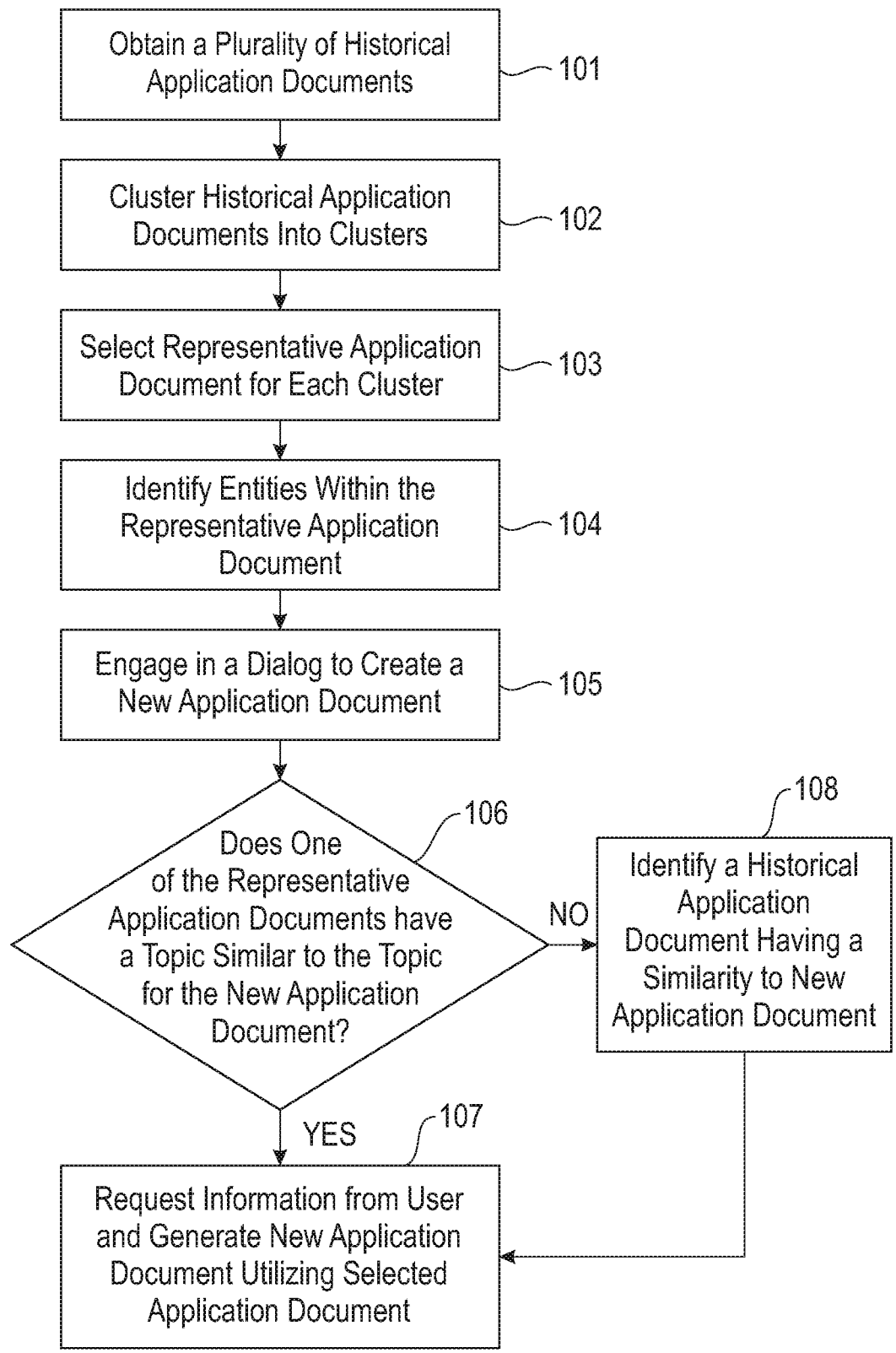
FIG. 1 illustrates a method of generating and populating a new application document utilizing a representative application document that is identified from historical previously populated application documents and that has a topic similar to the new application document.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Having an application document for communication is advantageous since a previously designed application document provides a previously identified format for an automated system to utilize when processing and analyzing information included within the application document. Thus, entities would prefer to have previously generated application documents for any communications that may occur between a user and the entity. However, creating and generating an application document for every possible situation would be time-consuming and infeasible since it is impossible to know every possible situation that could arise. Thus, many entities create generic application documents that include few structured fields for capturing information that may be germane to every communication (e.g., name, contact information, etc.), and then provide unstructured fields that allow a user to provide information that is relevant to the particular communication in an unstructured format.

However, a problem with unstructured information is that for a system to process the information, the system has to include advanced programming that allows the system to understand and process natural language information, since much of the information included in unstructured fields is provided in a natural language format. Such a system is more expensive and requires more processing resources than a less advanced system. Additionally, even with the more advanced systems, being able to parse the unstructured information in order to properly respond to or direct the communication may be difficult, given the large variety of information and formats that may be included in the unstructured fields. This results in longer processing and response times and may result in frustration for many users. Additionally, it may also result in misdirected communications which, in turn, also results in longer processing and response times. Additionally, using generic application documents may result in information that is necessary for processing a specific request or query to be missing. In other words, because the user is not presented with a particular form structure, the user may not provide necessary information. This may result in the user needing to be contacted to obtain the missing information, which also results in longer processing and response times.

Accordingly, an embodiment provides a system and method for generating and populating a new application document utilizing a representative application document that is identified from historical, previously populated application documents and that has a topic similar to the new application document. The system obtains historical application documents that contain information that has been used to populate the historical application documents. Within these historical application documents, at least a portion of the provided information is included in an unstructured format. The system identifies a topic or purpose corresponding to the historical application document, for example, a topic of the request or query corresponding to the application document, a department or unit that processed and responded to the request or query, or the like. Utilizing the topics, the system clusters the historical application documents into clusters containing application documents having similar topics. From each cluster the system selects a representative application document.

Upon receiving a request from a user to generate a new application document, the system identifies a topic associated with the new application document request. Identifying the topic may be based upon receiving an indication of the topic from the user, or may include identifying the topic from other information provided by the user. Once the topic for the new application document is identified, the system identifies the representative application document of the cluster associated with that topic. The system then utilizes the representative application document to generate the new application document. In populating the new application document, the system can automatically populate some of the information. For example, the system may access information from a user device to be used in populating the application document, for example, location information, user profile information, or the like. For information that cannot be automatically populated, the system may engage in a dialogue with the user where the system utilizes the representative application document to request information from the user that is pertinent to the application document being generated. For example, the system may segment the representative application document into sections that need information from the user. The system may then present questions or requests for information to the user that assist in populating these sections.

Such a system provides a technical improvement over current systems for application document generation and population. The system takes historical application documents that have previously been populated and clusters the historical application documents by topic or purpose. From each cluster the system can select a representative application document. This representative application document can then be used as a template for creating and populating a new application document when a user provides input indicating that the user wants to generate a new application document. Since the system utilizes a representative application document as a template, the system can request information from the user to accurately populate the newly generated application document. Then, even though the information may be provided in an unstructured format, the system understands the field that the information was provided for.

This assists the system in parsing and analyzing the provided information. Therefore, the described system and method provide a technique for generating and populating an application document that does not require manual creation of application documents that may be necessary for all possible requests or queries. Additionally, since the system uses historical information, the described system provides generation and population of an application document that ensures complete, consistent, information is provided and also assists the system in processing and responding to the request or query, thereby reducing processing resource and time expenses while ensuring accurate and complete application documents, which reduces processing and response times.

FIG. 1 illustrates a method for generating and populating a new application document utilizing a representative application document that is identified from historical, previously populated application documents and that has a topic similar to one of the new application documents. At 101 the system obtains a plurality of historical application documents, or application documents that have been previously populated or submitted. Obtaining the application documents may include a user providing the application documents to the system, for example, by uploading the application documents to the system, providing a link or a pointer to a data storage location storing the application documents, or the like. Obtaining the application documents may also include the system retrieving the application documents, for example, by accessing a data storage location accessible by the system, by accessing a secondary device that locally stores the application documents, or the like. The technique utilized for obtaining the application documents does not have to be same technique for each application document. In other words, the application documents may be obtained using a variety of techniques.

Each of the historical application documents corresponds to an application document that has been previously generated and populated with information provided by a user. Since the application document has been populated using information provided by a user, at least a portion of the information included in the application documents may be unstructured information, for example, as included in a comment section, as included in an additional information section, as included in a problem section, or the like. The application document may also include information that was provided within a structured field section, for example, a name field, contact information field(s), address field(s), or the like.

The application document that was populated with information by a user may be an application document that was presented to the user and populated directly by the user, for example, as an application document having fillable fields that the user directly provided information into, as an application that included a series of questions that correspond to a field within the application document, or the like. Additionally, or alternatively, the application document may be an application document that was generated by a system utilizing information provided by a user within a secondary system or application, for example, a user contacted a customer service center and provided information to the customer service center that was used by the system to generate and populate the application document, or the like. Thus, the application document does not have to be directly created and populated by the user. Rather, the application document may be generated and populated by a system utilizing information provided by a user.

At 102 the system may cluster the plurality of historical application documents into clusters of application documents, where each cluster includes historical application documents that are directed to a similar topic or have a similar purpose. Thus, each historical application document within a cluster or group will have a topic or purpose that is similar to the other historical application documents within the group. In order to cluster the application documents, the system may identify the purpose or topic of each of the historical application documents. To identify the purpose or topic of an application document, the system may use text parsing and information extraction techniques to extract or identify keywords associated with each application document. From the keywords, the system can utilize analysis techniques to determine an purpose or topic of the application document. For example, the system may utilize a machine-learning model that is trained for topic identification, keyword-text modelling techniques, paraphrase models, or the like.

The system may also utilize similarity models to find a similar document or application document whose topic or purpose has already been identified. If the application document matches an application document or document that has an identified topic within a predetermined threshold, the system may assign the same topic to the historical application document that does not yet have an identified topic or purpose. The topic may also be identified within a portion or section of the application document, for example, within one of the fields of the application document, within the title of the application document, or the like. If this portion or section is identified to the system as including the topic, the system may simply extract the topic from this portion or section of the application document.

After identifying the purpose or topic for each historical application document, the system identifies historical application documents directed to similar topics, for example, by utilizing one or more similarity techniques, for example, similarity measures, cosine similarity, clustering techniques, affinity measurements, class distribution measures, and the like. Application documents having a topic similar within a predetermined threshold may be grouped together in the same group or cluster. Each cluster may contain a different number of historical application documents, for example, one cluster may include fifty historical application documents, while another cluster may include one hundred historical application documents. Additionally, the variation of topic similar within clusters may vary across the clusters. The variation may occur when one cluster contains very few application documents and is, therefore, grouped with another cluster that has a similarity to the first cluster. By grouping these clusters, the variation in topic similar increases within the aggregated cluster.

For each cluster or group the system may select a representative application document at 103. The representative application document may be treated as a template for generating a new application document. In selecting the representative application document, the system may select one of the application documents included in the cluster based upon predetermined criteria. For example, the system may select the application document that includes the most fields or information as the representative application document. By selecting the application document that includes the most fields, the system can ensure that an application document generated from the representative application document will request all possible information that is necessary for resolving the query or request corresponding to the application document. As another example, the system may select an application document as the representative application document based upon a most common application document layout. In other words, the system may identify which fields are most commonly included in an application document within the cluster and select one of those application documents as the representative application document. Alternatively, instead of selecting an application document from the cluster, the system may generate a blank application document having fields utilizing fields from the application documents within the cluster.

At 104 the system identifies entities within the representative application documents. For ease of readability, the discussion will focus on a single representative application document. However, the same steps and process will be completed for all of the representative application documents for each of the clusters. Entities within the application document correspond to information that is to be provided within the application document. In other words, the entities represent the information that will need to be populated within an application document that is generated based upon the representative application document. Thus, each of the entities require information for filling out the application document, for example, name, phone number, address or location, issue, or the like. To identify the entities, the system may employ an entity model that is trained for entity identification (e.g., a Named Entity Recognizer, Entity Classifier, etc.), information extractor, information annotator, parts-of-speech analyzer, natural language processing technique, or the like.

Additionally, with identifying the entities, the system may segment the representative application document into different sections, for example, the problem statement, problem description, problem severity, conclusion, summary, and other sections that may be applicable to a particular application document. By segmenting the representative application document into different sections, the dialogue module can address all of the sections during the interaction session with the user when generating and populating a new application document based upon the representative application document. To perform the segmentation, the system may utilize a pre-trained classifier that is trained to take an application document as an input and return the application document with annotations corresponding to the different sections of the application document. These annotations will be used in providing requests for information from the user when generating and populating the new application document.

At 105 the system may engage in a dialogue with a user to create a new application document. This dialogue engagement may be in response to a user providing an indication to start a new application document. For example, the user may have a query or request and provide an indication to the system that the user desires to begin a new application document to submit the query or request to the appropriate entity. In providing the indication to start a new application document, the user may also provide information regarding the topic or purpose of the new application document. The user may also provide additional information, for example, the user may provide keywords or other information that may be used to generate or populate the application document.

To engage in the dialogue with the user, the system may access the representative application document of the cluster that has a topic or purpose similar to the topic or purpose of the new application document. Thus, the system may determine if one of the representative application documents has a topic that is similar to the topic of the new application document at 106. If the user provided the topic or purpose, the system can utilize a search across the topics of the clusters to find one or more cluster topics that are similar to the provided topic. If the user has not provided a topic, the system may identify the purpose or topic for the new application document from other information provided by the user. For example, the system may utilize similarity techniques to match keywords or other information provided by the user to the cluster topics. In the case that the system finds more than one cluster topic that is similar, either based upon the user provided topic or the similarity technique analysis, the system may provide a dialogue box to the user identifying those similar cluster topics and request the user select one of the cluster topics. The system may then access the representative application document corresponding to the cluster having the topic chosen by the user or the topic of the similar cluster.

If the system cannot find a cluster having a topic similar to the new application document topic, at 108, the system may attempt to identify a historical application document that has a similarity to the new application document, where the similarity is not based upon a topic of the new application document or only partially based upon the topic of the new application document. In this case the system may request additional information from the user that can be used to create keywords that can be used to search the historical application documents, not just the representative application documents. The system can use similarity techniques to determine if any of the historical application documents have a similarity to the new application document.

If one or more of the historical application documents has a similarity to the new application document, the historical application document may be used as the representative application document for engaging in the dialogue with the user. If neither a representative application document nor a historical application document has a similarity to the new application document, the system can start with a generic application document and generate and populate the generic application document during the dialogue with the user. A generic application document may also be modified based upon information found in the historical application documents. For example, if all or a majority of the historical application documents include a particular field, the system may include that field in the generic application document. Using a generic application document may result in additional requests for information from the user that may not have been present if a similar application document could have been utilized.

On the other hand, if a representative application document can be identified or a historical application document can be utilized as the representative application document at 106, the system may request information from the user to generate and populate the new application document during the dialogue at 107. The system may attempt to automatically populate some of the fields within the new application document using information captured from a secondary source or device. For example, if the application document has a field for location, the system may access location information from a device that is being utilized by the user in generating and populating the application document. As another example, the system may access user profile information stored on a device of the user and use this information to populate name fields, address fields, contact information fields, or the like. In other words, the system may identify a context of the user, which may include information related to the environment of a user, information related to an activity of a user, information related to a profile of a user, or the like, to assist in automatically populating one or more of the fields within the new application document. In automatically populating the fields, the system may also request user confirmation regarding the accuracy of the information that is populated within the fields.

For those fields that cannot be automatically populated, the system may request information from the user. To efficiently request information from the user, the system utilizes the recognized entities and sections of the representative application document to request pertinent and targeted information that is needed for populating the application document. For example, the system may request the user to provide a problem statement for the new application document. In generating the requests for information, the system may utilize the representative application document to provide examples or choices for the user to select rather than requiring the user to manually fill out a section. As an example, for a problem statement section, the system may provide three example problem statements for the user to choose from in filling out this section. If none of these are applicable, the user may manually provide a problem statement. Alternatively, the user may select one of the problem statement examples and modify the example to suit the needs of the user.

Once the dialogue has been completed, the system may refine the information included in the new application document. Refining the information may include ensuring that the provided information is grammatically and semantically accurate with respect to other information included in the application document or document. The system may use natural language processing techniques or language models to refine the application document. Additionally, the system may verify whether any documents or attachments need to be included with the submission of the application document. For example, some application documents may require pictures or other supporting documents. For example, if the application document is a request to have a name changed, a document supporting the name change may need to be attached with the request. If the application document requires attachments, the system may request that the user provide the attachments.

After the system has checked the application document, the system may present the completed application document to the user so that the user can verify the information included in the application document is accurate and conveys the request or query. While the system may treat the new application document and representative application documents as having fields, the resulting application document may not include fields. In other words, when reviewing the completed application document, the user may not visually see fields. Instead, the completed application document may look like an email, text message, or some other free-form document.

Figure 2:
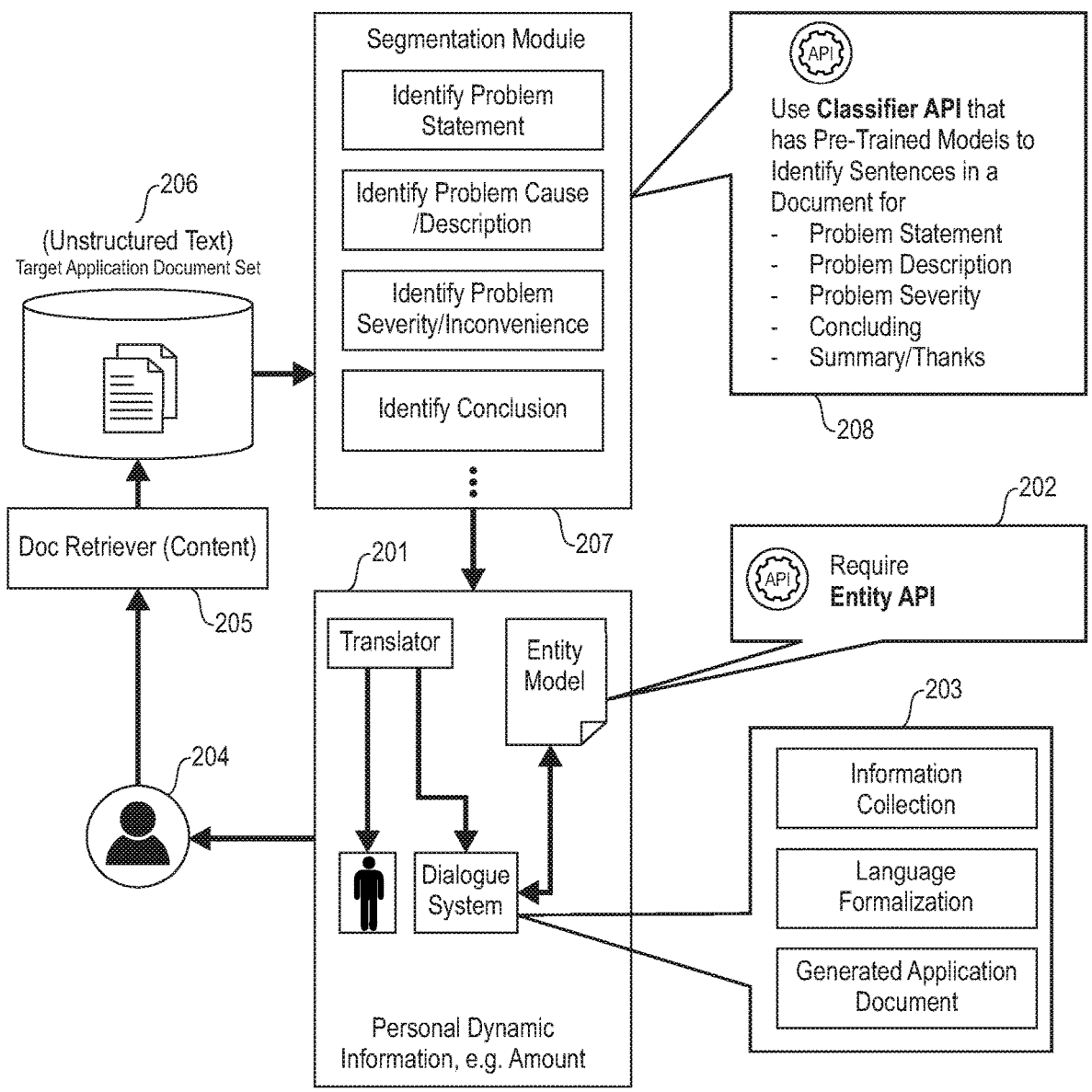
FIG. 2 illustrates an example interactive dialogue system architecture.

An example interactive dialog system architecture is shown in FIG. 2. The dialog system 201 includes a translator that takes the information received by the user and converts it to a machine-readable format understood by the system and also takes information provided by the system and converts it into a natural language format understandable by the user 204. From the user provided information the system identifies entities and calls upon an entity application programming interface (API) 202. The system 201 also uses information collection, language formalization, and generated application document 203 when communicating with the user 204. The information collection module is used to collect information from the user. The language formalization module is used to ensure information included in the application document is accurate and complete. The generated application document is the document that is generated after the dialogue has been completed.

To generate the document, the interactive dialogue system engages in a dialogue with the user 204. Based upon information provided by the user, the system utilizes a document retriever module 205 that retrieves historical application documents based upon a similarity between (i) the content or topic of the new application document the user is attempting to generate and (ii) the content or topics of the historical documents. This results in a return of the target application document set 206 which are those historical application documents that are similar to the new application document. From the target application document set 206, the system employs a segmentation module 207 to segment the historical documents into sections, for example, the problem statement, problem cause/description, problem severity, conclusion, and the like, utilizing a classifier API 208 that has pre-trained models that identify the sections. Once the sections are identified, the interactive dialogue system uses the identified sections to request information from the user. For example, the system may note that the historical application documents include a problem severity based upon output from the segmentation module 207. The interactive dialogue system may then provide a prompt to the user indicating that the problem severity section is generally included and requesting the user to provide the information for this section.

Figure 3:
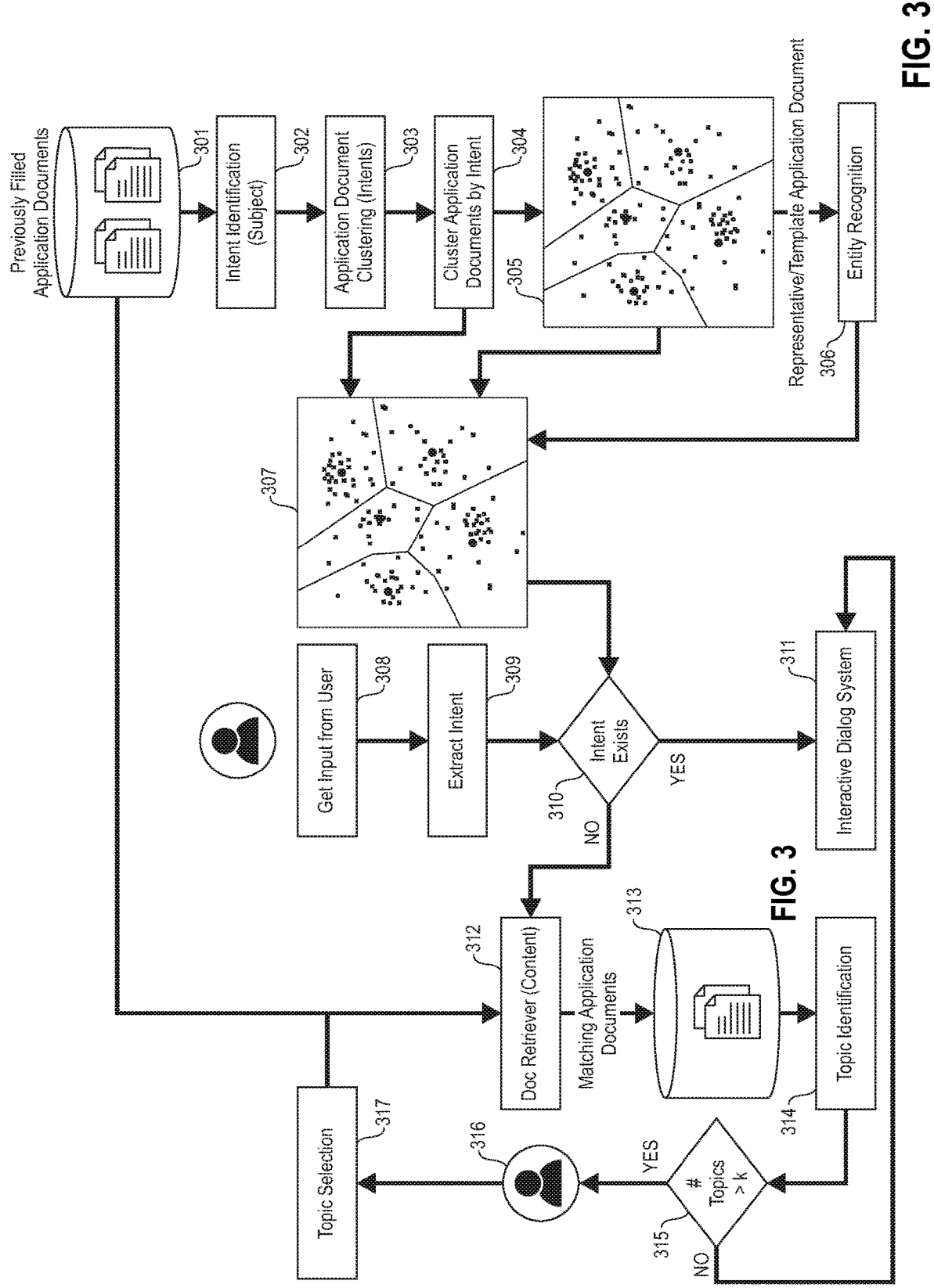
FIG. 3 illustrates an example system architecture for generating and populating a new application document utilizing a representative application document that is identified from historical previously populated application documents and that has a topic similar to the new application document.

FIG. 3 illustrates an example system architecture of the described system. The system obtains previously filed application documents 301. From the previously filed application documents, or historical application documents, the system utilizes an purpose (or subject) identification component 302 that identifies the purpose or subject of each of the historical application documents. The system then utilizes an application document clustering component 303 that clusters the historical application documents based upon the purposes of the historical application documents. The output of the application document clustering component 303 is clusters of application documents based upon the purpose 304. Specifically, the system clusters application documents having a similar purpose, or purposes having a similarity within a predetermined threshold within the cluster. From each cluster, the system selects a representative or template application document 305. The system utilizes an entity recognition component 306 to recognize entities within the representative application documents 305. From the clusters 304, representative application document 305, and recognized entities 306, the system associates entities and purposes with each application document in the cluster 307.

Upon receiving input from a user to generate a new application document 308, the system extracts the purpose for the new application document utilizing an extract purpose component 309. The system then compares the extracted purpose with the purposes of the representative application document to determine if one of the representative application documents has a matching or similar purpose as the new application document 310. If a similar representative application document does not exist, the system utilizes a document retriever 312 that retrieves content of historical application documents 301. Using the content, the system determines if a historical application document exists that has a similarity to the new application document. If a historical application document exists, then the system uses that application document as the representative application document 313 for generating and populating the new application document. The system then identifies the topic from the historical application document using the topic identification component 314. If multiple topics are identified, the system requests the user to select a topic at 315. The user then provides input 316 of the topic selection 317. The system then retrieves the matching representative application document or historical document using the document retriever 312.

The interactive dialogue system 311 is utilized in three scenarios. If a similar representative application document does exist as determined at 301, the system utilizes the interactive dialogue system 311 for interacting with the user to fill out the new application document based upon the retrieved representative application document. If a historical document is retrieved to be used as the representative application document, for example, from 313, the system utilizes the interactive dialogue system 311 for interacting with the user to fill out the new application document based upon the retrieved historical application document acting as the representative application document. If neither a representative application document nor a historical application document can be retrieved, the system utilizes the interactive dialogue system 311 to interact with the user to fill out a generic application document or create a new application document for the user request or query.

Thus, the described systems and methods represent a technical improvement over current systems for application document generation and population. The system is able to utilize historical application documents that have already been populated with information to create a new application document for use by a user. The new application document includes defined sections that can be identified from the historical application document. Thus, while the resulting populated application document includes unstructured information, this information is provided within known section formats. Since an automated system knows the type of information that is being provided within a particular field, the system is able to more accurately process and analyze the information, thereby resulting in faster and more accurate processing and response times. Additionally, since the new application document is generated from the historical application documents, the system can ensure that the user is providing all the information necessary for properly processing the request or query included within the application document. Thus, the described system and method provide a technique for generating and populating an application document that is unique to the particular purpose or topic of the user instead of using generic application documents. Such a technique results in an application document that captures all the necessary information in a predefined or pre-identified format which allows for easier processing by automated systems, thereby resulting in faster processing and response times and reduced user frustration.

Figure 4:
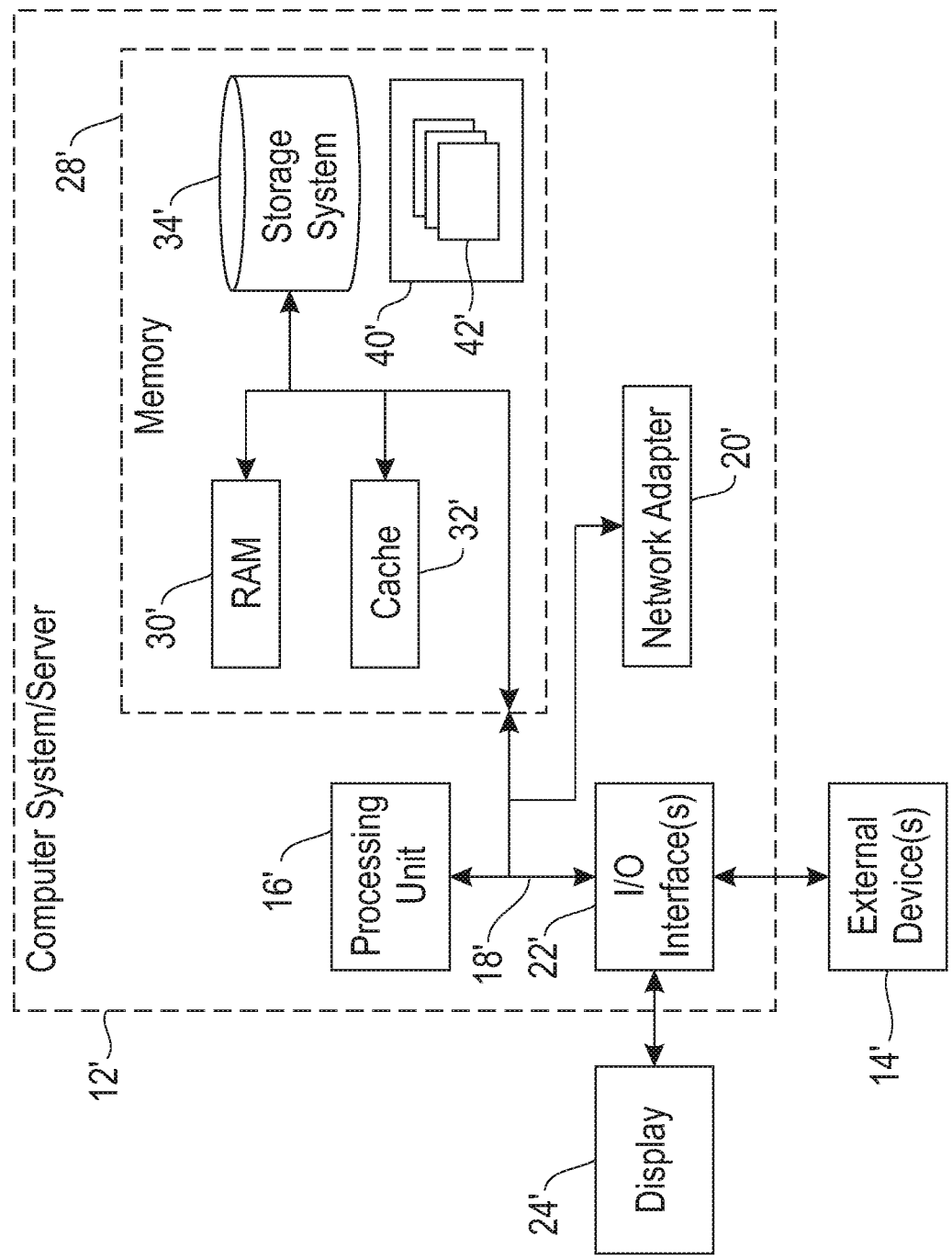
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    obtaining a plurality of previously submitted application documents, wherein each of the previously submitted application documents has a corresponding topic and comprises information provided by a user who initiated a given previously submitted application document, wherein at least a portion of the information comprises unstructured information;
    clustering the plurality of previously submitted application documents into clusters of application documents based upon the topics of the previously submitted application documents, wherein the previously submitted application documents within a given cluster have similar topics among the previously submitted application documents included in the given cluster;
    selecting, for each cluster, a representative application document;
    identifying, for each representative application document of each of the clusters, entities contained within a given representative application document, wherein each of the entities in the representative application document corresponds to information to be entered into a new application document created from the given representative application document; and
    engaging in a dialogue with a user to create the new application document utilizing a similar representative application document to request information from the user, wherein the engaging comprises identifying a topic of the new application document, wherein the similar representative application document comprises one of the representative application documents from one of the clusters, the one of the clusters having a topic similar to the topic of the new application document, wherein the engaging comprises populating information received from the user via the dialogue into the new application document by identifying one of the entities in the one of the representative application documents corresponding to the information received form the user.

2. The method of claim 1, comprising generating the new application document using the representative application document as a template for the new application document; and
    populating the new application document with the information provided by the user.

3. The method of claim 2, comprising populating the new application document with information identified from a context of the user, the context being determined using a secondary source.

4. The method of claim 3, comprising refining information included within the populated application document such that the included information is both (i) grammatically and (ii) semantically accurate.

5. The method of claim 1, comprising segmenting the representative application document into different sections utilizing a pre-trained classifier.

6. The method of claim 1, comprising determining at least one document to be attached to the new application document.

7. The method of claim 1, comprising:
determining that a representative application document having a topic similar to the topic of the new application document is unavailable;
requesting additional information from the user regarding additional details of the new application document; and
identifying, utilizing the additional information, at least one of the plurality of previously submitted application documents having a similarity to the new application document.

8. The method of claim 7, comprising utilizing, during the dialogue with the user, the at least one of the plurality of previously submitted application documents having a similarity as the similar representative application document.

9. The method of claim 1, wherein the identifying entities comprises utilizing an entity model that is trained for entity recognition.

10. The method of claim 1, wherein the topic for the new application document is identified by the user.

11. An apparatus, comprising:
at least one processor; and
a computer readable storage medium having computer readable program code embodied therewith and executable by the at least one processor, the computer readable program code comprising:
computer readable program code configured to obtain a plurality of previously submitted application documents, wherein each of the previously submitted application documents has a corresponding topic and comprises information provided by a user who initiated a given previously submitted application document, wherein at least a portion of the information comprises unstructured information;
computer readable program code configured to cluster the plurality of previously submitted application documents into clusters of application documents based upon the topics of the previously submitted application documents, wherein the previously submitted application documents within a given cluster have similar topics among the previously submitted application documents included in the given cluster;
computer readable program code configured to select, for each cluster, a representative application document;
computer readable program code configured to identify, for each representative application document of each of the clusters, entities contained within a given representative application document, wherein each of the entities in the representative application document corresponds to information to be entered into a new application document created from the given representative application document; and
computer readable program code configured to engage in a dialogue with a user to create the new application document utilizing a similar representative application document to request information from the user, wherein the engaging comprises identifying a topic of the new application document, wherein the similar representative application document comprises one of the representative application documents from one of the clusters, the one of the clusters having a topic similar to a topic of the new application document, wherein the engaging comprises populating information received from the user via the dialogue into the new application document by identifying one of the entities in the one of the representative application documents corresponding to the information received form the user.

12. A computer program product, comprising:
a computer readable storage medium having computer readable program code embodied therewith, the computer readable program code executable by a processor and comprising:
computer readable program code configured to obtain a plurality of previously submitted application documents, wherein each of the previously submitted application documents has a corresponding topic and comprises information provided by a user who initiated a given previously submitted application document, wherein at least a portion of the information comprises unstructured information;
computer readable program code configured to cluster the plurality of previously submitted application documents into clusters of application documents based upon the topics of the previously submitted application documents, wherein the previously submitted application documents within a given cluster have similar topics among the previously submitted application documents included in the given cluster;
computer readable program code configured to select, for each cluster, a representative application document;
computer readable program code configured to identify, for each representative application document of each of the clusters, entities contained within a given representative application document, wherein each of the entities in the representative application document corresponds to information to be entered into a new application document created from the given representative application document; and
computer readable program code configured to engage in a dialogue with a user to create the new application document utilizing a similar representative application document to request information from the user, wherein the engaging comprises identifying a topic of the new application document, wherein the similar representative application document comprises one of the representative application documents from one of the clusters, the one of the clusters having a topic similar to a topic of the new application document, wherein the engaging comprises populating information received from the user via the dialogue into the new application document by identifying one of the entities in the one of the representative application documents corresponding to the information received form the user.

13. The computer program product of claim 12, comprising generating the new application document using the representative application document as a template for the new application document; and
populating the new application document with the information provided by the user.

14. The computer program product of claim 13, comprising populating the new application document with information identified from a context of the user, the context being determined using a secondary source.

15. The computer program product of claim 14, comprising refining information included within the populated application document such that the included information is both (i) grammatically and (ii) semantically accurate.

16. The computer program product of claim 12, comprising segmenting the representative application document into different sections utilizing a pre-trained classifier.

17. The computer program product of claim 12, comprising determining at least one document to be attached to the new application document.

18. The computer program product of claim 12, comprising:
- determining that a representative application document having a topic similar to the topic of the new application document is unavailable;
- requesting additional information from the user regarding additional details of the new application document;
- identifying, utilizing the additional information, at least one of the plurality of previously submitted application documents having a similarity to the new application document; and
- utilizing, during the dialogue with the user, the at least one of the plurality of previously submitted application documents having a similarity as the similar representative application document.

19. The computer program product of claim 12, wherein the identifying entities comprises utilizing an entity model that is trained for entity recognition.

* * * * *